United States Patent
Chiu et al.

(10) Patent No.: US 11,362,505 B2
(45) Date of Patent: Jun. 14, 2022

(54) PROTECTIVE ELEMENT AND A FABRICATION METHOD THEREOF

(71) Applicant: CONQUER ELECTRONICS CO., LTD., New Taipei (TW)

(72) Inventors: Hung-Chih Chiu, New Taipei (TW); Po-Shuo Chiu, New Taipei (TW)

(73) Assignee: CONQUER ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/150,569

(22) Filed: Jan. 15, 2021

(65) Prior Publication Data

US 2022/0115860 A1    Apr. 14, 2022

(30) Foreign Application Priority Data

Oct. 12, 2020  (TW) .................................. 109135239

(51) Int. Cl.
*H01H 69/02* (2006.01)
*H02H 3/08* (2006.01)
*H01H 85/02* (2006.01)

(52) U.S. Cl.
CPC .......... *H02H 3/08* (2013.01); *H01H 85/0241* (2013.01); *H01H 69/022* (2013.01); *H01M 2200/103* (2013.01)

(58) Field of Classification Search
CPC ............. H01H 69/022; H01H 85/0047; H01H 85/0241; H01M 2200/103; H02H 3/08
See application file for complete search history.

(56) References Cited

U.S. PATENT DOCUMENTS

| 6,034,589 A * | 3/2000 | Montgomery ..... H01H 85/0411 29/623 |
| 6,269,745 B1 * | 8/2001 | Cieplik ................ H01H 85/046 102/202.5 |

(Continued)

FOREIGN PATENT DOCUMENTS

| CN | 104835702 A | 8/2015 |
| JP | 2004-111192 A | 4/2004 |

(Continued)

OTHER PUBLICATIONS

Machine Translation of Chen CN104835702A (Year: 2015).*
Search Report dated Oct. 12, 2020 in TW Application No. 109135239, 2 pages.

*Primary Examiner* — Jacob R Crum
(74) *Attorney, Agent, or Firm* — Muncy, Geissler, Olds & Lowe P.C.

(57) ABSTRACT

A protective element has a body, an inner connection layer, an outer connection layer, a heating layer and a low-melting-point alloy layer. The body is made of a single insulation material. The inner and outer connection layers are formed on two upper and lower surfaces of the body. The low-melting-point alloy layer is formed on the upper surface of the body and is electrically connected to the inner connection layer. The heating layer is mounted inside the body and is electrically connected to the low-melting-point alloy layer by the inner connection layer. The outer connection layer is electrically connected to the low-melting-point alloy layer and the heating layer. The outer connection layer is soldered on a power circuit. When the power circuit encounters overcurrent, the heating layer is heated to fuse the low-melting-point alloy layer faster. Thus, power circuit is cut to protect the power circuit.

10 Claims, 9 Drawing Sheets

(56) References Cited

U.S. PATENT DOCUMENTS

| | | | |
|---|---|---|---|
| 2004/0184211 A1* | 9/2004 | Bender | H01H 85/0047 361/104 |
| 2005/0087853 A1* | 4/2005 | Okumura | H01L 21/76898 257/686 |
| 2005/0141164 A1* | 6/2005 | Bender | H01H 85/0047 361/104 |
| 2006/0067021 A1* | 3/2006 | Li | H01C 7/13 361/30 |
| 2008/0191832 A1* | 8/2008 | Tsai | H01H 85/046 337/297 |
| 2011/0220402 A1* | 9/2011 | Fang | H01L 23/49805 174/260 |
| 2012/0134059 A1* | 5/2012 | Sumi | H01C 7/1006 361/56 |
| 2014/0340046 A1 | 11/2014 | Komori et al. | |
| 2017/0236673 A1* | 8/2017 | Yoneda | H01H 85/06 337/293 |
| 2018/0033578 A1* | 2/2018 | Ogawa | H01H 85/0241 |

FOREIGN PATENT DOCUMENTS

| | | |
|---|---|---|
| JP | 2013-229295 A | 11/2013 |
| JP | 2014-175129 A | 9/2014 |
| JP | 2017-147162 A | 8/2017 |
| KR | 10-1307530 | 9/2013 |
| TW | 201212087 A | 3/2012 |
| TW | 201545195 A | 12/2015 |
| TW | 201807733 A | 3/2018 |
| TW | 201917764 A | 5/2019 |
| TW | M606920 Y | 1/2021 |
| WO | WO2019065727 A1 | 4/2019 |
| WO | WO2019/103211 A1 | 5/2019 |

\* cited by examiner

PROTECTIVE ELEMENT AND A FABRICATION METHOD THEREOF

CROSS-REFERENCE TO RELATED APPLICATIONS

This application is based upon and claims priority under 35 U.S.C. 119 from Taiwan Patent Application No. 109135239 filed on Oct. 12, 2020, which is hereby specifically incorporated herein by this reference thereto.

BACKGROUND OF THE INVENTION

1. Field of the Invention

The present invention is related to a protective element, and more particularly to a protective element has a low-melting-point alloy layer.

2. Description of the Prior Arts

A conventional power circuit usually has a protective element. When a power loop of the conventional power circuit is abnormal, such as suffering overcurrent or overvoltage. The protective element may cut off the power loop of the conventional power circuit to protect the conventional power circuit.

US20140340046A1 discloses a conventional protective element, which is hereby specifically incorporated herein by this reference thereto. FIG. 3A and 3B of US20140340046A1 shows a conventional protective element. A concave portion is formed on a substrate. A heating body is disposed on the concave portion. A second substrate or second insulating member (as shown in FIG. 9B of US20140340046A1) is covered on the concave portion. The second substrate has a heating body electrode, two electrodes and a connection terminal formed thereon. A low-melting-point metal is disposed on the heating body electrode and the electrodes. The heating body electrode is electrically connected to the heating body via a through hole through the second substrate and is electrically connected to the connection terminal. The conventional protective element is soldered on a power circuit. When a power loop of the power circuit encounters overcurrent, large current flows through the low-melting-point metal via the electrodes and also flows through the heating body via the through hole and the connection terminal. Then the low-melting-point metal is fused quickly by heating from the heating body so that a loop between the electrodes is cut off to protect the power circuit.

However, the process to manufacture the conventional protective element of US20140340046A1 is too complicated. Particularly, the substrate needs to have the concave portion in advance for disposing the heating body, and then the heating body also needs to be covered by the second substrate or the insulating member.

To overcome the shortcomings, the present invention provides a protective element and a fabrication method thereof to mitigate or to obviate the aforementioned problems.

SUMMARY OF THE INVENTION

An objective of the present invention is to provide a protective element and a fabrication method thereof to obviate the aforementioned problems.

To achieve the objective as mentioned above, the protective element comprising:
a body made of a single insulation material and having a first surface and a second surface;
an inner connection layer formed on the first surface of the body;
a low-melting-point alloy layer mounted on the first surface of the body and electrically connected to the inner connection layer;
a heating layer mounted inside the body and electrically connected to the low-melting-point alloy layer; and
an outer connection layer formed on the second surface of the body and electrically connected to the low-melting-point alloy layer and the heating layer.

From the above description, the heating layer is mounted inside the body of the protective element, so the concave portion or the insulating member do not need to reduce the steps and the time. When the heating layer is heated, the heat may stores inside the body to fuse the low-melting-point alloy layer.

To achieve the objective as mentioned above, the fabrication method comprising steps of:
(a) providing a first substrate and a second substrate, wherein
the first substrate has a first surface and a plurality of first device areas defined on the first surface;
the second substrate has a third surface and a plurality of second device areas defined on the third surface; and
the first device areas respectively correspond to the second device areas;
(b) forming multiple outer connection layers respectively on each of the first device areas, forming multiple inner connection layers respectively on each of the second device areas, forming a plurality of heating layers between the first substrate and the second substrate, wherein each of the outer connection layer is formed on one of the first device areas, each of the inner connection layers is formed on one of the second device areas, each of the heating layers corresponds to one of the first device areas and corresponds to one of the second device areas;
(c) stacking the second substrate on the first substrate with a fourth surface of the second substrate facing to the a second surface of the first substrate;
(d) sintering the first substrate and the second substrate to a body with a single insulation material, wherein the heating layers are mounted inside the body and are encapsulated by the body;
(e) stacking a plurality of low-melting-point alloy layers on the inner connection layers, wherein each of the low-melting-point alloy layers is electrically connected to one of the heating layers and one of the outer connection layers by the inner connection layer; and
(f) cutting the body along adjacent edges of the second device areas to form a plurality of protective elements.

In conclusion, the outer connection layers are formed on the first substrate simultaneously, the inner connection layers are formed on the second substrate simultaneously, and the heating layers are formed between the first and second substrate simultaneously. When the first substrate and the second are sintered to the body, the heating layers are mounted inside the body, so the concave portion or the insulating member are not needed to effectively reduced the process time.

Other objectives, advantages and novel features of the invention will become more apparent from the following detailed description when taken in conjunction with the accompanying drawings.

DETAILED DESCRIPTION OF THE EMBODIMENTS

The present invention is related to a protective element and a fabrication method thereof. With embodiments and drawings thereof, the features of the present invention are described in detail as fallow.

Figure 1A:
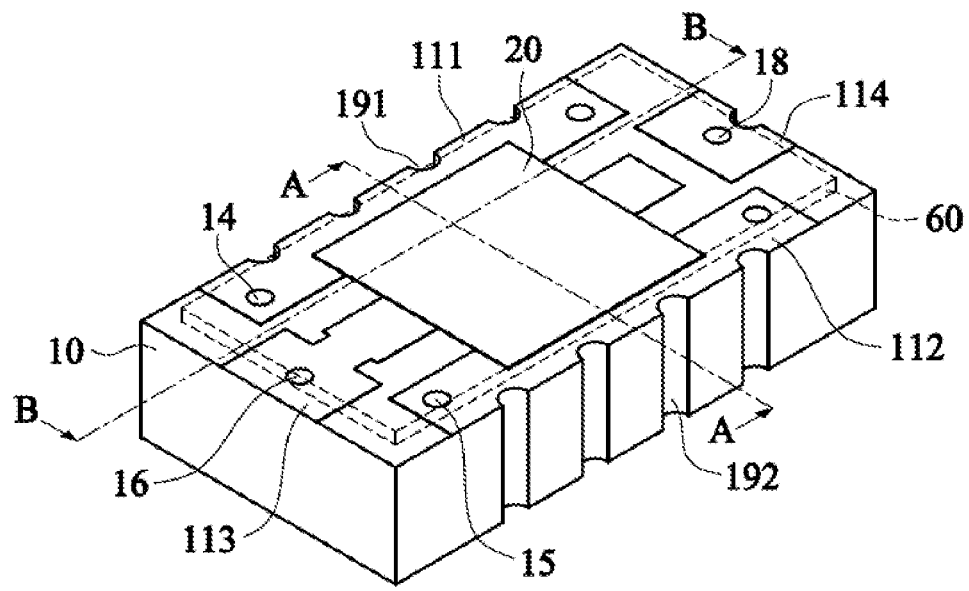
FIG. 1A is a perspective view of a first embodiment of a protective element in accordance with the present invention.
Figure 1B:
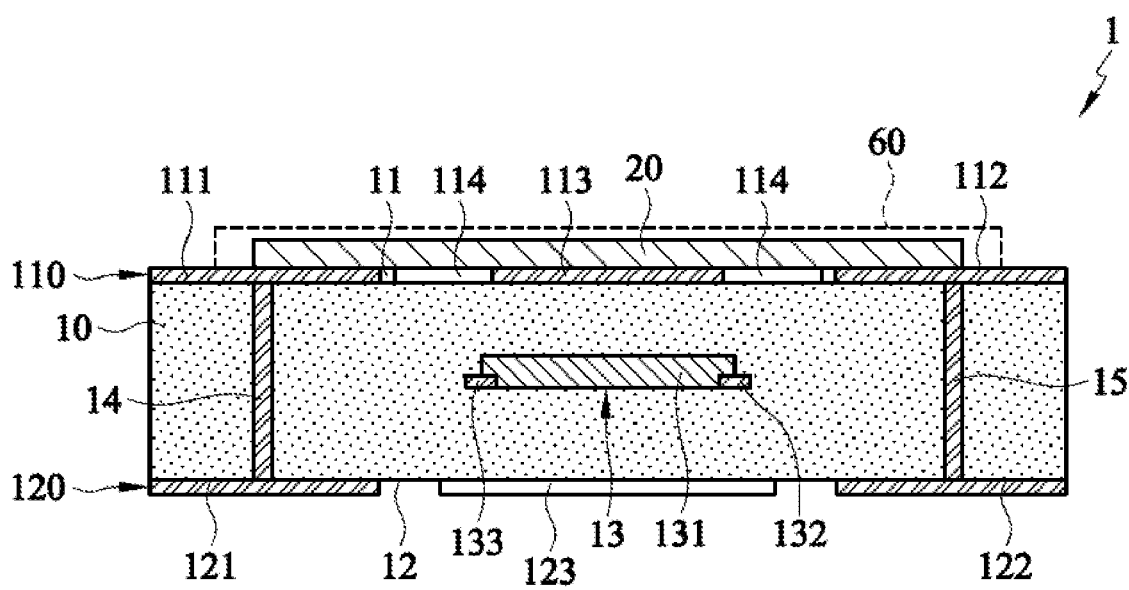
FIG. 1B is a cross-sectional view of the A-A line of FIG. 1A.
Figure 1C:
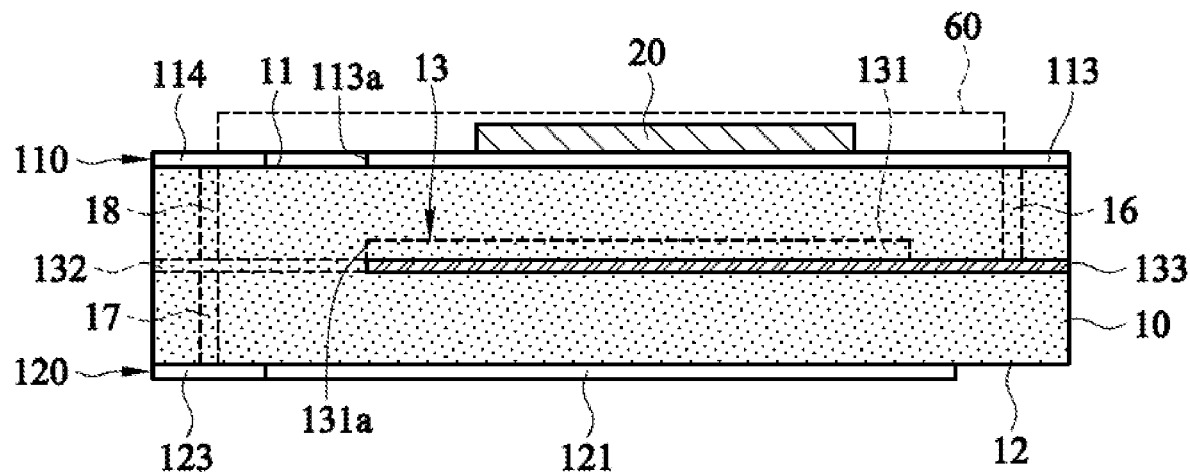
FIG. 1C is a cross-sectional view of the B-B line of FIG. 1A.

With reference to FIGS. 1A, 1B and 1C, a first embodiment of a protective element 1 in accordance with the present invention has a body 10, an inner connection layer 110, an outer connection layer 120, a heating layer 13 and a low-melting-point alloy layer 20.

The body 10 has a first surface 11, a second surface 12, a plurality of first conductive vias 14, a plurality of second conductive vias 15, a first conductive hole 16, a second conductive hole 17 and a third conductive hole 18. In this embodiment, the first conductive vias 14 and the second conductive vias 15 are formed through the body 10 and are exposed on the first surface 11 and the second surface 12. The first conductive hole 16 and the third conductive hole 18 are exposed on the first surface 11. The second conductive hole 17 is exposed on the second surface 12. The first conductive hole 16, the second conductive hole 17 and the third conductive hole 18 are shallower than the first conductive vias 14 and the second conductive vias 15. The second conductive hole 17 aligns with and communicates with the third conductive hole 18. In one embodiment, the second conductive hole 17 and the third conductive hole 18 may be formed integrated. In one embodiment, the body 10 is a single insulation material. In one embodiment, the body 10 is made of a low temperature co-fired ceramic (LTCC), is rectangular and has two opposite long sides and two opposite short sides.

Figure 2A:
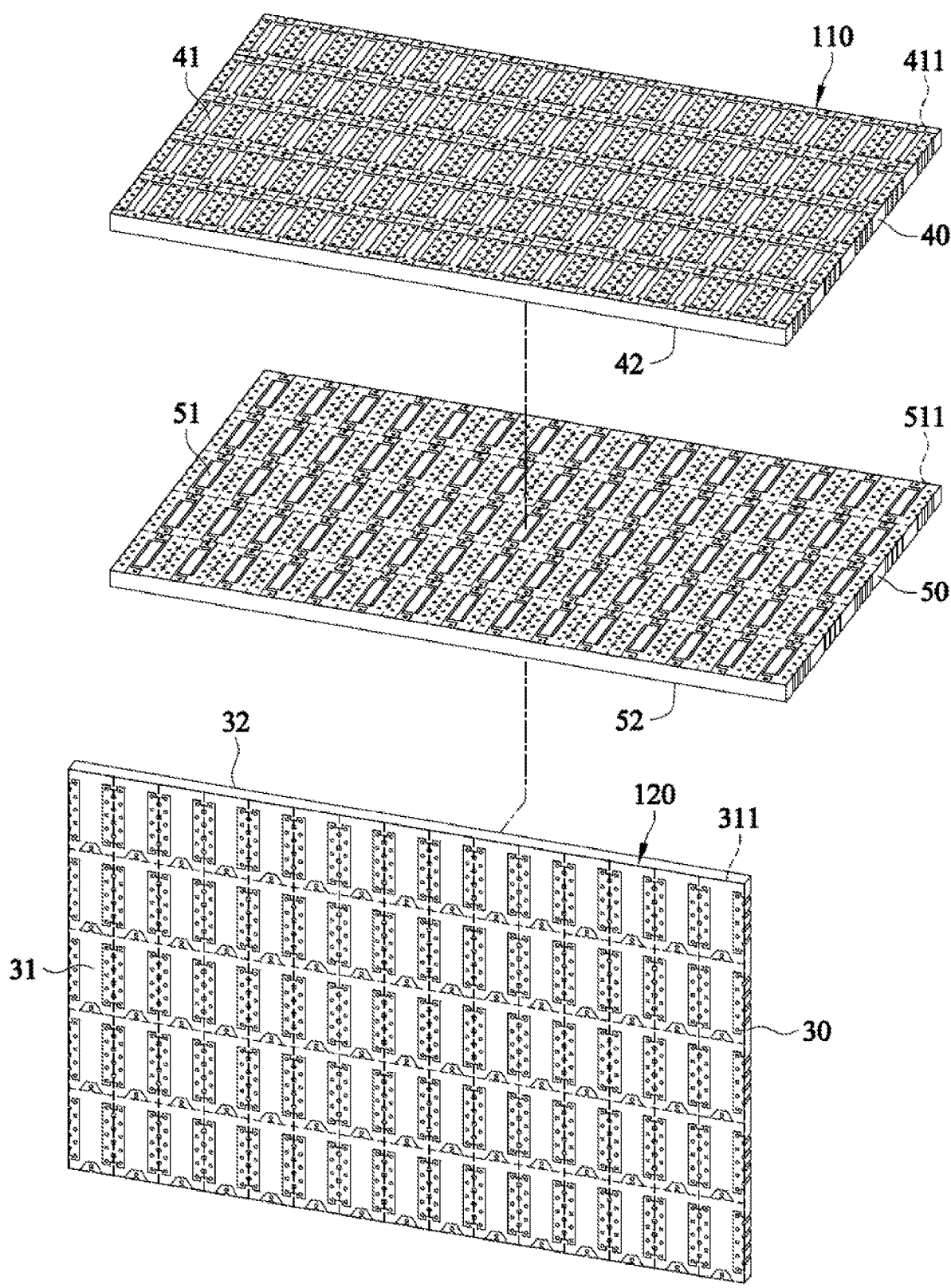
FIG. 2A is a perspective view of one of the steps of a fabrication method of a protective element in accordance with the present invention.
Figure 2D:
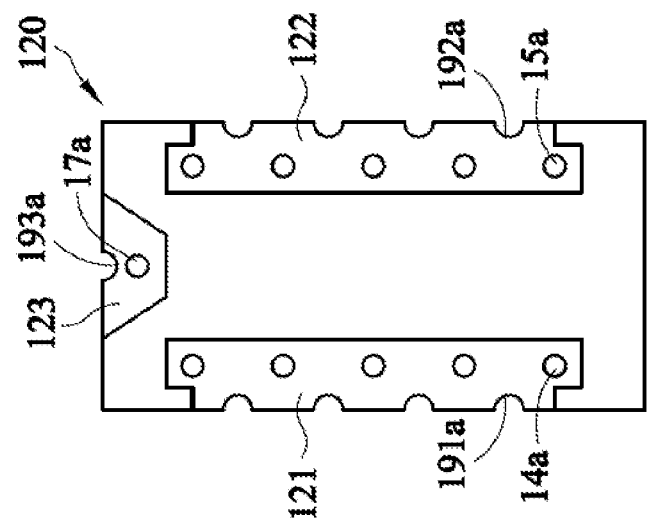
FIG. 2D is a bottom view of a first device area of FIG. 2A.
Figure 2C:
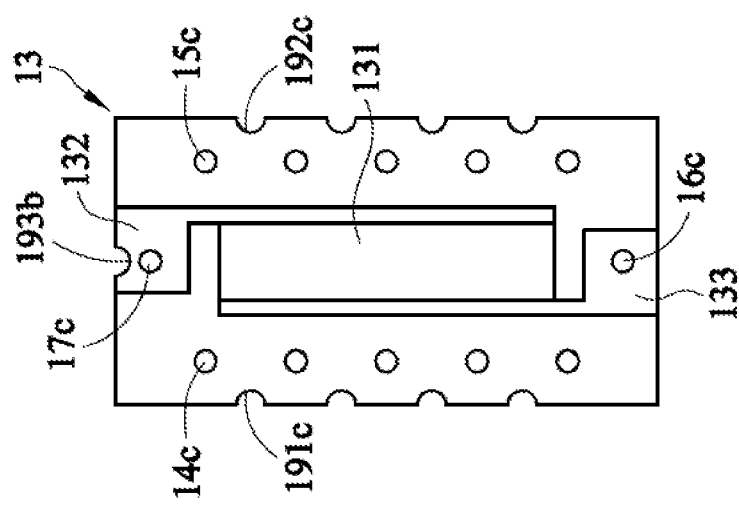
FIG. 2C is a top view of a third device area of FIG. 2A.
Figure 2B:
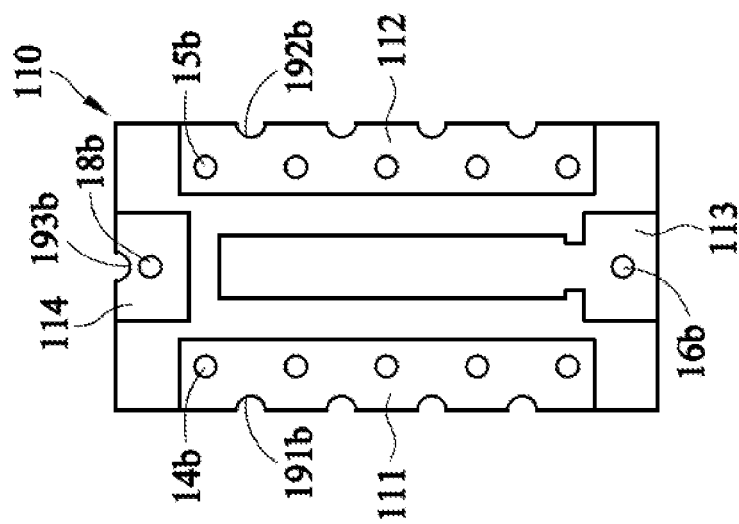
FIG. 2B is a top view of a second device area of FIG. 2A.

With reference to FIGS. 1A, 1B and 2B, the inner connection layer 110 is formed on the first surface 11 and has a third electrode 111, a fourth electrode 112, a second thermal electrode 113 and a heat-conduction electrode 114. In this embodiment, the third and fourth electrodes 111, 112 are respectively formed on the two opposite long sides of the first surface 11 and are respectively electrically connected to the first and second conductive vias 14, 15. The second thermal and heat-conduction electrodes 113, 114 are respectively formed on the two opposite short sides of the first surface 11 and are respectively electrically connected to the first and third conductive holes 16, 18. In one embodiment, the second thermal electrode 113 is extended between the third and fourth electrode 111, 112. The third electrode 111, the fourth electrode 112, the second thermal electrode 113 and the heat-conduction electrode 114 are made of metal materials, which are compatible with the LTCC process.

With reference to FIGS. 1A, 1B and 2D, the outer connection layer 120 is formed on the second surface 12 and has a first electrode 121, a second electrode 122 and a first thermal electrode 123. In this embodiment, the first electrode 121 corresponds to the third electrode 111 and electrically connects to third electrode 111 by the first conductive vias 14. The second electrode 122 corresponds to the fourth electrode 112 and electrically connects to fourth electrode 112 by the second conductive vias 15. The first and second electrodes 121, 122 are respectively formed on the two opposite long sides of the second surface 12. With reference to FIG. 1C, the first thermal electrode 23 is formed on the one short side of the second surface 12. The first thermal electrode 23 corresponds to the heat-conduction electrode 114 and electrically connects to the heat-conduction electrode 114 by the second and third conductive holes 17, 18. In one embodiment, the first, second and the first thermal electrodes 121, 122 and 123 are defined as the surface mount pads of the protective element 1. The first, second and the first thermal electrodes 121, 122 and 123 are made of metal materials, which are compatible with the LTCC process.

The heating layer 13 is mounted inside the body 10. One end of the heating layer 13 is electrically connected to the first conductive hole 16, the other end of the heating layer 13 is electrically connected to the second and third conductive holes 17, 18. With reference to FIGS. 1C and 2C, the heating layer 13 comprises a heating body 131, a first heating body electrode 132 and a second heating body electrode 133. In this embodiment, the first heating body electrode 132 corresponds to the first thermal electrode 123 and electrically connects to the first thermal electrode 123 by the second conductive hole 17. The second heating body electrode 133 corresponds to the second thermal electrode 113 and electrically connects to the second thermal electrode 113 by the first conductive hole 16. The heating body 131 is formed between the first and second heating body electrodes 132, 133 and is electrically connected to the first and second heating body electrodes 132, 133. One end 131a of the heating body 131 aligns with one end 113a of the second thermal electrode 113. In one embodiment, the heating body 131 is made of resistive paste. The first and second heating body electrodes 132, 133 are made of metal materials, which are compatible with the LTCC process.

Figure 4A:
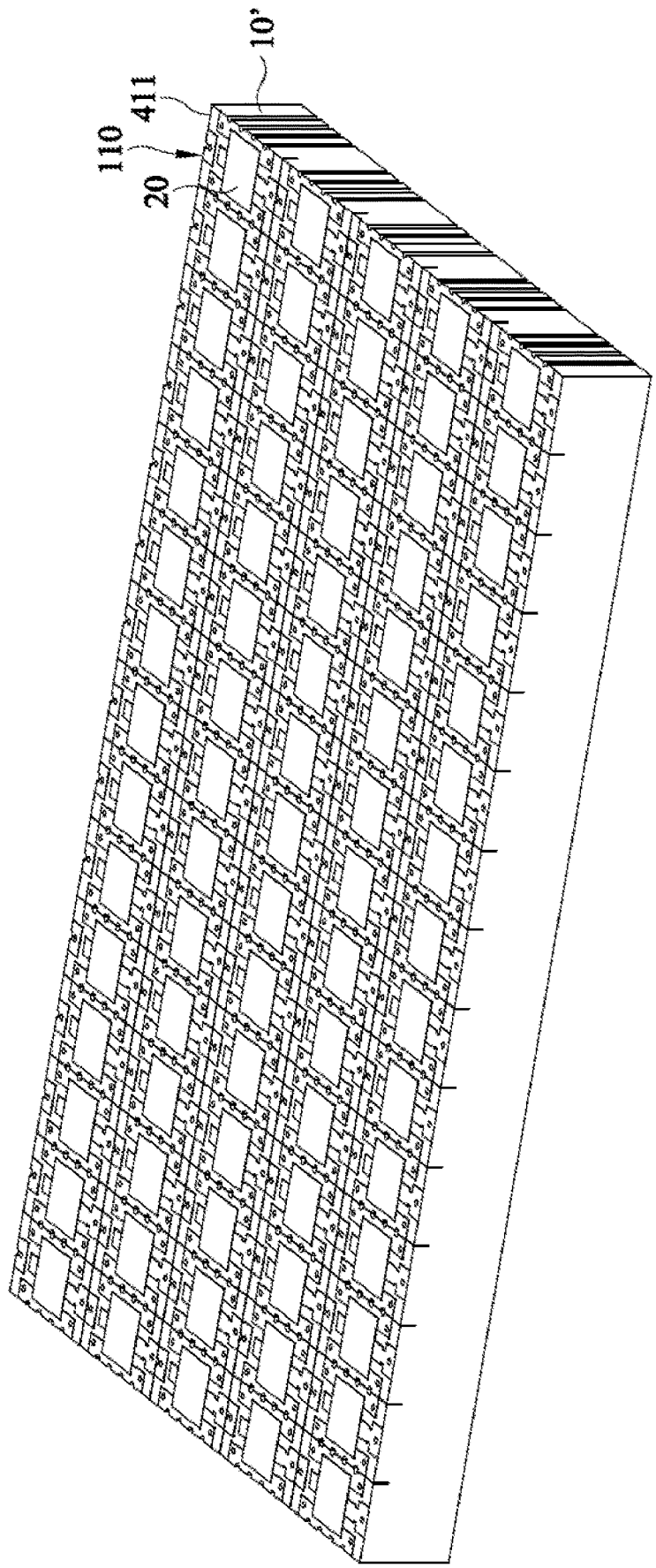
FIG. 4A is a perspective view of one of the steps of a fabrication method of a protective element in accordance with the present invention.
Figure 4B:
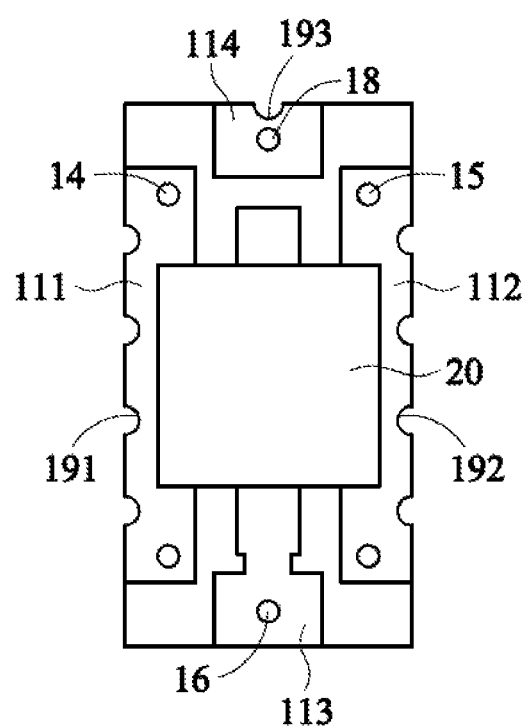
FIG. 4B is a top view of a second device area of FIG. 4A.

With reference to FIGS. 1A, 1B and 4B, the low-melting-point alloy layer 20 is mounted on the first surface 11 and is electrically connected to the third, fourth and second thermal electrodes 111, 112 and 113. In this embodiment, the low-melting-point alloy layer 20 is respectively electrically connected to the first and second electrodes 121, 122 through the third and fourth electrodes 111, 112. In one embodiment, the low-melting-point alloy layer 20 is soldered on the third, fourth and second thermal electrodes 111, 112 and 113, but not limited thereto. The low-melting-point alloy layer 20 is made of a first alloy or a second alloy, but not limited thereto. The first alloy consists of tin, lead, bismuth, copper and silver, but not limited thereto. The second alloy consists of tin, bismuth, copper and silver, but not limited thereto.

With the foregoing description, the first, second and first thermal electrodes 121, 122 and 123 as the surface mount pads of the protective element 1 are soldered on a power circuit. When the power circuit encounters overcurrent, the larger current flows through the first electrode 121, the first conductive vias 14, the third electrode 111, the low-melting-point alloy layer 20, the fourth electrode 112 the second conductive vias 15 and the second electrode 122 to increase the temperature of the low-melting-point alloy layer 20. The larger current also flows through the low-melting-point alloy layer 20, the second thermal electrode 113, the first conductive hole 16, the heating layer 13, the second conducive hole 17 and the first thermal electrode 123 to heat the heating layer 13. Thus, the heat may stores inside the body 10 by the heating layer 13 to fuse the low-melting-point alloy layer 20 faster than the conventional low-melting-point alloy layer.

Figure 1D:
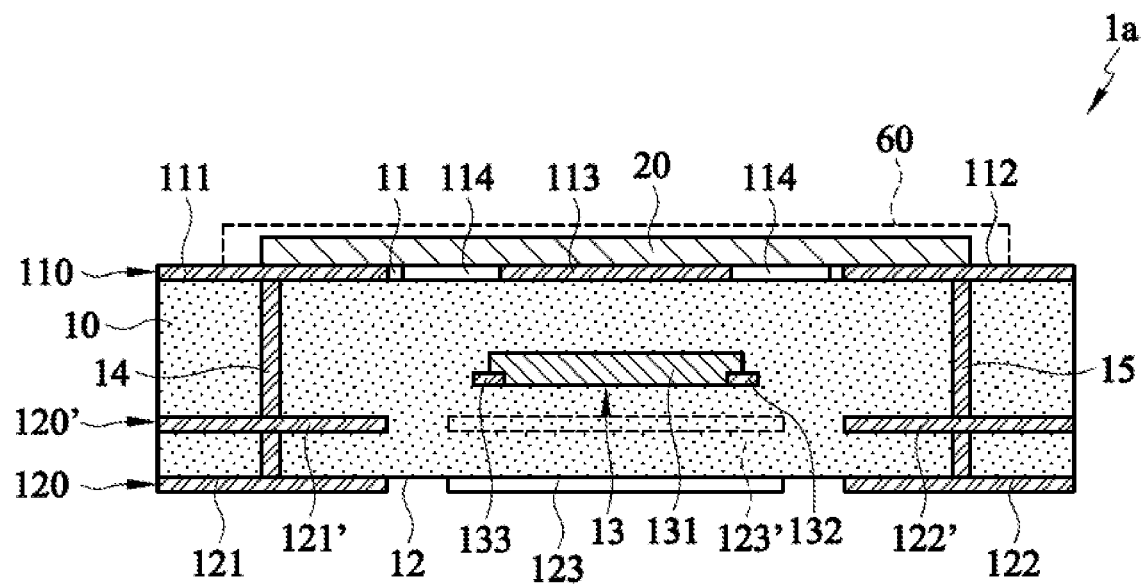
FIG. 1D is a cross-sectional view of a second embodiment of a protective element in accordance with the present invention.

With reference to FIG. 1D, a second embodiment of a protective element 1a in accordance with the present invention has similar elements with the protective element 1, but the protective element 1a further has a heat-dissipation layer 120'. The heat-dissipation layer 120' is disposed between the heating layer 13 and the outer connection layer 120 and is mounted inside the body 10 and is encapsulated by the single insulation body 10. In this embodiment, the heat-dissipation layer 120' is electrically connected to the inner connection layer 110, the outer connection layer 120 and the heating layer 13. The heat-dissipation layer 120' has similar elements with the outer connection layer 120, such as a first heat-dissipation film 121' corresponds to the first electrode 121, a second heat-dissipation film 122' corresponds to the second electrode 122, and a third heat-dissipation film 123' corresponds to the first thermal electrode 123. Thus, the first conductive vias 14 is formed through the first heat-dissipation 121', the second conductive vias 15 is formed through the second heat-dissipation 122', and the second conductive hole 17 is formed through the third heat-dissipation film 123'. Therefore, the heat-dissipation layer 120' is electrically connected to the inner conduction layer 110 and outer conduction layer 120 by the first conductive vias 14 and the second conductive vias 15, and is electrically connected to the heating layer 13 by the second conductive hole 17 and third conductive hole 18. In one embodiment, the protective element as described has a plurality of heat-dissipation layers 120' equidistantly mounted inside the body 10 for heat dissipation, not limited to one tier of heat-dissipation layers 120'.

With reference to FIGS. 2A, 3, 4A and 5, a first embodiment of a fabrication method of the protective element comprises following steps (a) to (f).

With reference to FIG. 2A, in the step (a), a first substrate 30 and a second substrate 40 are provided, but not limited thereto. In this embodiment, the first substrate 30 and the second substrate 40 are made of low temperature co-fired ceramic (LTCC). The first substrate 30 has a first surface 31 and a plurality of first device areas 311 defined on the first surface 31. The second substrate 30 has a third surface 41 and a plurality second device areas 411 defined on the third surface 41. Each of the first device areas 311 corresponds to one of the second areas 411. With reference to FIG. 2D, each of the first device areas 311 has a plurality of first holes 14a, 15a formed thereon, a first hole 17a formed thereon, a plurality of first sidewall recesses 191a, 192a formed thereon, and a first sidewall recess 193a formed thereon. With reference to FIG. 2B, each of the second device areas 411 has a plurality of second holes 14b, 15b formed thereon, a second hole 18b formed thereon, a third hole 16b formed thereon, a plurality of second sidewall recesses 191b, 192b formed thereon, and a second sidewall recess 193b formed thereon. The first holes 14a, 15a, 17a, the second holes 14b, 15b, 18b, the third holes 16b, the first sidewall recesses 191a, 192a, 193a and the second sidewall recesses 191b, 192b, 193b are filled with conductive materials, which are compatible with the LTCC process. In one embodiment, the first holes 14a, 15a, 17a, the second holes 14b, 15b, 18b and the third holes 16b are formed by laser. The adjacent edges of the first device areas 311 and the second device areas 411 are formed by laser, but not limited thereto. Thus, the first sidewall recesses 191a, 192a, 193a are formed on the edges of first device areas, and the second sidewall recesses 191b, 192b, 193b are formed on the edges of second device areas, but not limited thereto.

With reference to FIGS. 2A to 2D, in the step (b), multiple outer connection layers 120 are formed respectively on each of the first device areas 311. Multiple inner connection layers 110 are formed respectively on each of the second device areas 411. Each of the outer connection layers 120 is formed one of the first device areas 311. Each of the inner connection layers 110 is formed on one of the second device areas 411. A plurality of heating layers 13 are formed between the first substrate 30 and the second substrate 40. Each of the heating layers 13 corresponds to one of the first device areas 311 and corresponds to one of the second device areas 411. With reference to FIG. 2D, each of the first device areas 311 has a first electrode 121, a second electrode 122, and a first thermal electrode 123 formed thereon to consist the corresponding outer connection layer 120. In this embodiment, the first electrode 121 and the second electrode 122 are respectively formed on two opposite long sides of each of the first device areas 311. The first thermal electrode 123 is formed on one short side of each of the first device areas 311. The first electrode 121 corresponds to the first holes 14a and the first sidewall recesses 191a of each of the first device areas 311. The second electrode 122 corresponds to the first holes 15a and the first sidewall recesses 192a of each of the first device areas 311. The first thermal electrode 123 corresponds to the first sidewall recess 193a of each of the first device areas 311. In one embodiment, the first electrodes 121, the second electrodes 122 and the thermal electrodes 123 are printed on the first device areas 311.

With reference to FIGS. 2A and 2B, each of the second device areas 411 has a third electrode 111, a fourth electrode 112, a second thermal electrode 113 and a heat-conduction electrode 114 thereon to consist the inner connection layer 110. In this embodiment, the third electrode 111 and the fourth electrode 112 are respectively formed on two opposite long sides of each of the second device areas 411. The second thermal electrode 113 and the heat-conduction electrode 114 are respectively formed on two opposite short sides of each of the second device areas 411. The third electrode 111 corresponds to the second holes 14b and the second sidewall recesses 191b of each of the second device areas 411. The fourth electrode 112 corresponds to the second holes 15b and the second sidewall recesses 192b of each of the second device areas 411. The second thermal electrode 113 corresponds to the third hole 16b of each of the second device areas 411. The heat-conduction electrodes 114 corresponds to the second hole 18b and the second sidewall recess 193b of each of the second device areas 411.

The third electrodes 111 respectively correspond to the first electrodes 121. The fourth electrodes 112 respectively correspond to the second electrodes 122. The heat-conduction electrodes 114 respectively correspond to the first thermal electrodes 123. In one embodiment, the third electrodes 111, fourth electrodes 112, the second thermal electrodes 113 and the heat-conduction electrodes 114 are printed on the second device areas 411.

With reference to FIGS. 2A to 2D and 3A to 3B, in the step (c), a fourth surface 42 of the second substrate 40 is stacked on a second surface 32 of the first substrate 30. The first holes 14a, 15a, 17a respectively correspond to the second holes 14b, 15b, 18b. The third holes 16b respectively correspond to the heating layers 13. The first sidewall recesses 191a, 192a, 193a respectively correspond to the second sidewall recesses 191b, 192b, 193b. In this embodiment, the second substrate 40 is cut along with the edges of the second device areas 411 to a depth dl. The depth dl is shallower than the second substrate 40.

With reference to FIG. 4A, in the step (d), the first substrate 30 and the second substrate 40 are sintered to a single insulation material body 10'. The heating layers 13 are mounted inside the body 10' and are encapsulated by the body 10'. With reference to FIGS. 1A, 2B, 2C and 2D, the first holes 14a and the second holes 14b are respectively connected integrally to constitute a plurality of first conductive vias 14. The first conductive vias 14 are electrically connected to the first electrodes 121 and the third electrodes 111. The first holes 15a and the second holes 15b are respectively connected integrally to constitute a plurality of second conductive vias 15. The second vias 15 are electrically connected to the second electrodes 122 and the fourth electrode 112. The first holes 17a and the conductive materials thereof are respectively connected integrally to constitute a plurality of second conductive holes 17. The second holes 18b and the conductive materials thereof are respectively connected integrally to constitute a plurality of third conductive holes 18. The third holes 16b and the conductive materials thereof are respectively connected integrally to constitute a plurality of first conductive holes 16. With reference to FIG. 1C, the second conductive hole 17 is electrically connected to the first thermal electrode 123 and a first heating body electrode 132 of the heating layer 13. The third conductive hole 18 is electrically connected to the first heating body electrode 132 and the heat-conduction electrode 114. The first conductive hole 16 is electrically connected to a second heating body electrode 133 of the heating layer 13. With reference to FIG. 1A, the first sidewall recesses 191a, 192a, 193a and the second sidewall recesses 191b, 192b, 193b are respectively connected integrally to constitute a plurality of sidewall recesses 191, 192, 193. In one embodiment, the first electrodes 121, the second electrodes 122, the third electrodes 111, the fourth electrodes 1112, the first thermal electrodes 123, the second thermal electrodes 113, the heat-conduction electrodes and the sidewall recesses 191, 192, 193 are electroplated with tin or gold, but not limited thereto. The sidewall recesses 191 are electrically connected to the first electrode 121 and the third electrode 111. The sidewall recesses 192 are electrically connected to the second electrode 122 and the fourth electrode 112. The sidewall recess 193 is electrically connected to the first thermal electrode 123 and the heat-conduction electrode 114.

With reference to FIG. 4A, in the step (e), a plurality of low-melting-point alloy layers 20 are stacked on the inner connection layers 110. With reference to FIG. 1C, each of the low-melting-point alloy layers 20 is electrically connected to one of the heating layers 13 and one of the outer connection layers 120. With reference to FIG. 4B, the low-melting-point alloy layers 20 is electrically connected to the third electrode 111, the fourth electrode 112 and the second thermal electrode 113. In this embodiment, the low-melting-point alloy layers 20 is soldered to the third electrode 111, the fourth electrode 112 and the second thermal electrode 113, but not limited thereto.

Figure 5:
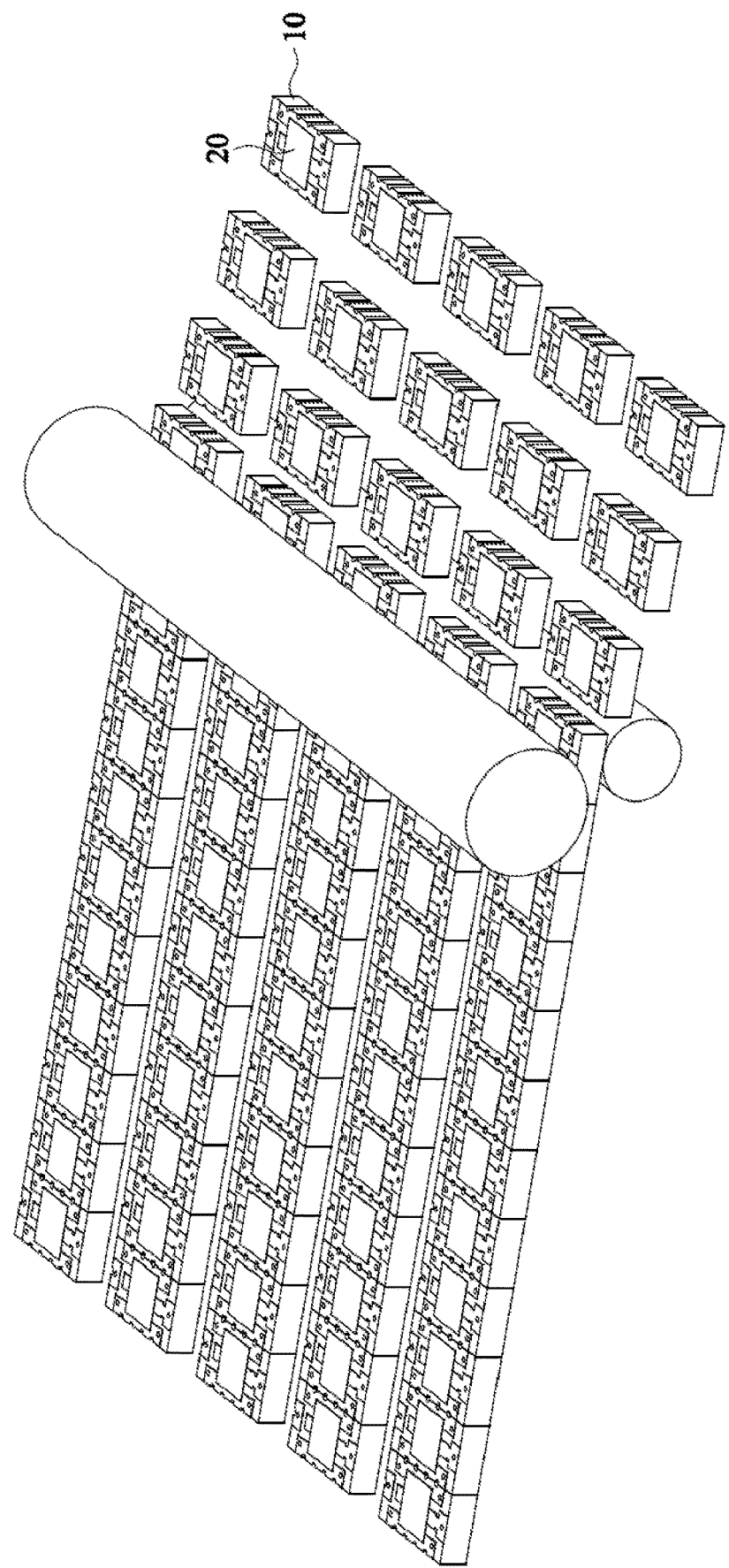
FIG. 5 is an operational schematic view of one of the steps of a fabrication method of a protective element in accordance with the present invention.

With reference to FIGS. 1A, 4A and 5, in the step (f), the body 10' is cut along adjacent edges of the second device areas 411 to form a plurality of protective elements 1. In this embodiment, a plurality of covers 60 are disposed on the second device areas 411 to form the protective elements 1 as shown in FIG. 1A. In one embodiment, the second substrate 40 is cut in advance in the step (c), so the body 10' may fractured by a dual roller to form the protective elements 1.

Figure 3A:
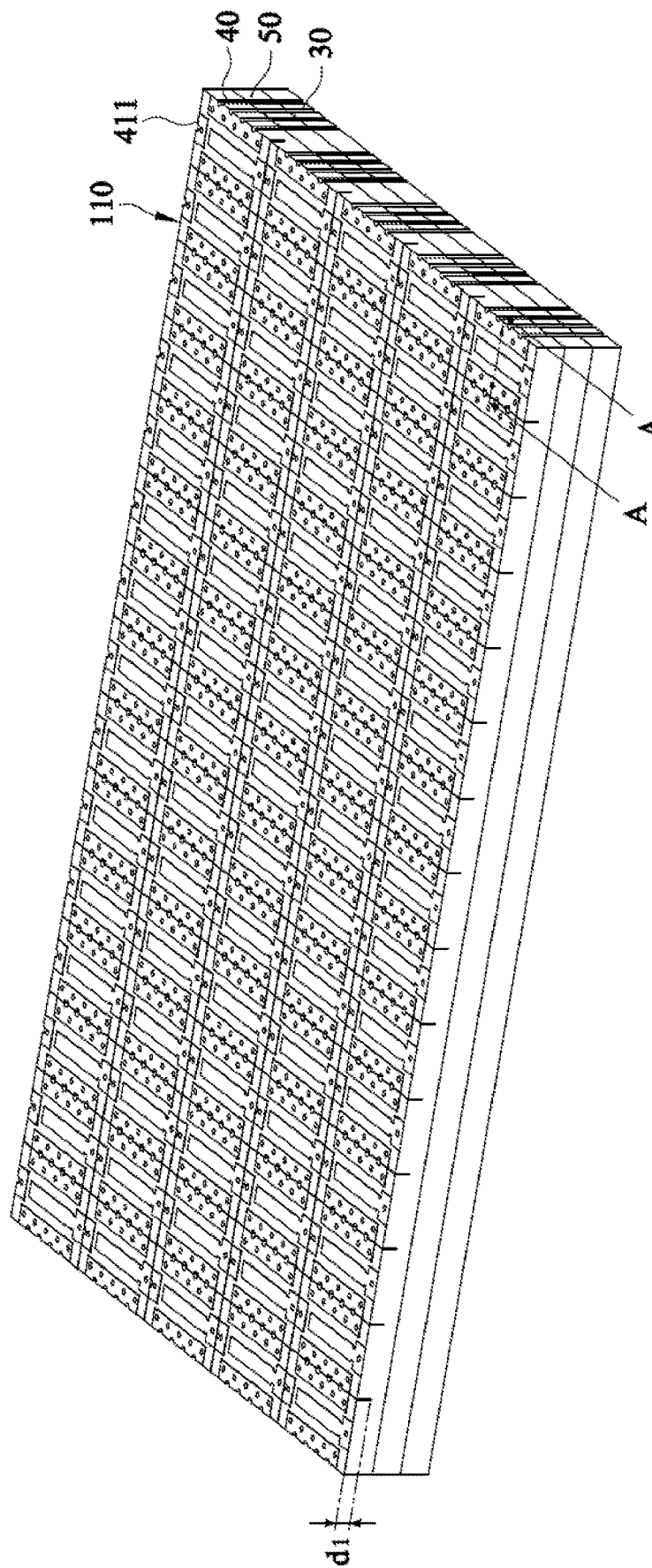
FIG. 3A is a perspective view of one of the steps of a fabrication method of a protective element in accordance with the present invention.
Figure 3B:
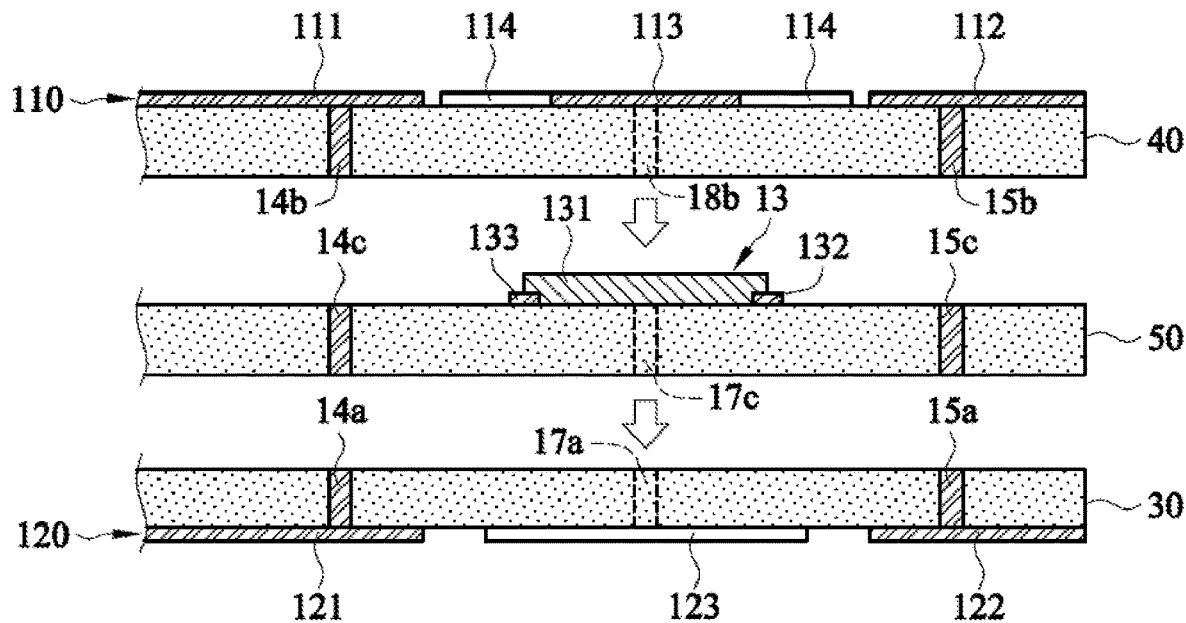
FIG. 3B is a lateral view of the A-A line of FIG. 3A.
Figure 3C:
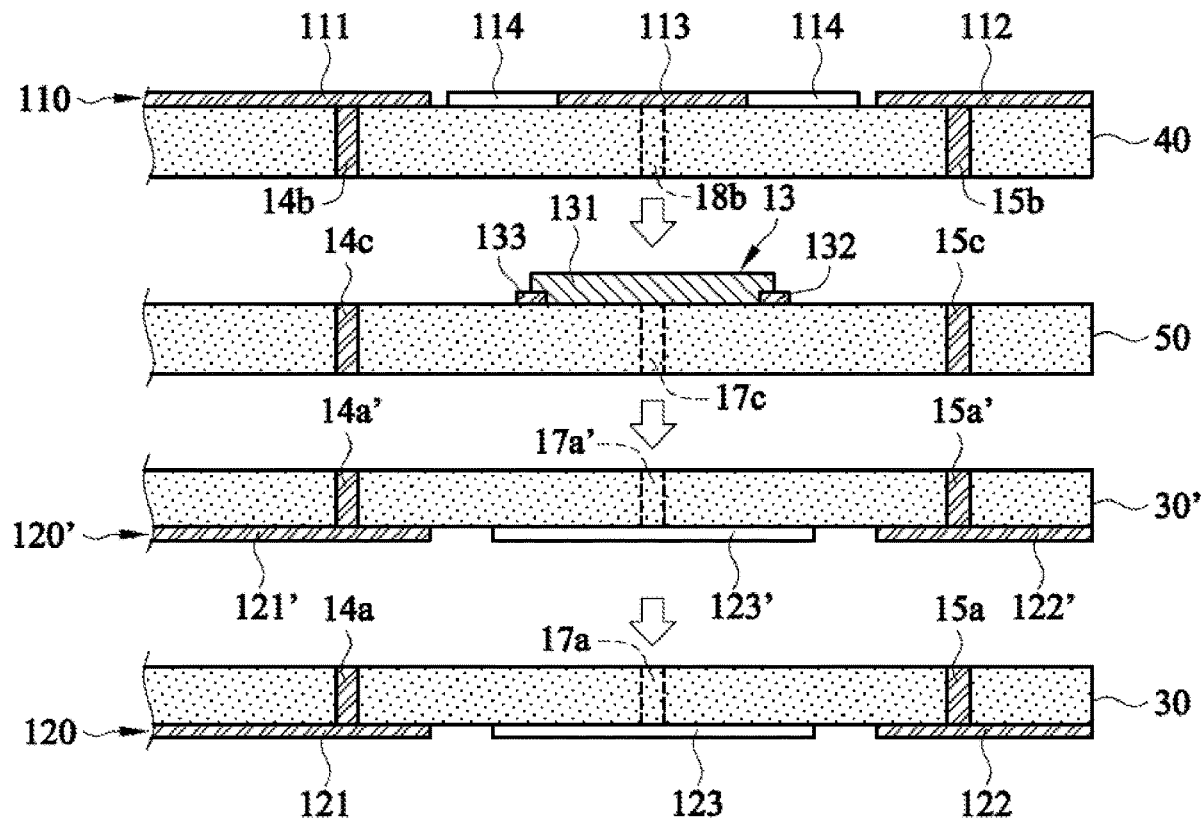
FIG. 3C is a lateral view of another embodiment of the A-A line of FIG. 3A.

With reference to FIG. 3C, a second embodiment of a fabrication method in accordance with present invention has similar steps with the step (a) to (f) in the first embodiment. In this embodiment, the protective elements further have a plurality of heat-dissipation layers 120'. In the step (a), an additional substrate 30' is provided and may similar to the first substrate 30. The fourth additional substrate 30' has a seventh surface and a plurality of additional device areas defined on the seventh surface. Each of the additional device areas corresponds to one of the first device area 311 and one of the second device area 411. In this embodiment, each of the additional device areas has a plurality of six holes 14a', 15a' formed thereon, a six hole 17a formed thereon, and a plurality first sidewall recesses (not shown in FIG.) formed thereon. The six holes 14a', 15a', 17a' of each of the additional device areas respectively correspond to the first holes 14a, 15a, 17a of one of the first device areas 311. The six holes 14a', 15a', 17a' and the first sidewall recesses are filled with conductive materials, which are compatible with the LTCC process. In one embodiment, the additional device areas are defined on the eighth surface of the additional substrate 30'.

With reference to FIG. 3C, in the step (b), each of the additional device areas is formed the heat-dissipation layer 120' thereon. The heat-dissipation layer 120' is similar to the outer connection layer, such as a first heat-dissipation film 121' corresponds to the first electrode 121, a second heat-dissipation film 122' corresponds to the second electrode 122, and a third heat-dissipation film 123' corresponds to the first thermal electrode 123. In this embodiment, the additional substrate 30' is disposed between the first substrate 30 and the heating layers 13.

With reference to FIG. 3C, in the step (c), the additional substrate 30' is stacked on the second surface 32 and is stacked under the heating layers 13. In this embodiment, the six holes 14a', 15a', 17a' of each of the additional device areas respectively correspond to the first holes 14a, 15a, 17a of one of the first device areas 311.

In the step (d), the six holes 14a', the first holes 14a and the second holes 14b are respectively connected integrally to constitute the first conductive vias 14. The six holes 15a', the first holes 15a, and the second holes 15b are respectively connected integrally to constitute the second conductive vias 15. The six holes 17a' and the first holes 17a are respectively connected integrally to constitute the second conductive holes 17. The first conductive vias 14 and the second conductive vias 15 are formed through the body 10'.

In the step (e), the heat-dissipation layer 120' is electrically connected to the inner conduction layer 110 and the outer conduction layer 120 by the first conductive vias 14 and the second conductive vias 15, and is electrically connected to the heating layer 13 by the second conductive hole 17 and third conductive hole 18.

In one embodiment, the body 10' has a plurality of additional substrate 40' between the first substrate 30 and the heating layers 13 for heat dissipation layer, not limited to one of the additional substrate 40'.

The fabrication method of the heating layers are further described as follows.

With reference to FIG. 2C, a first embodiment of a fabrication method of the heating layers 13 in accordance with the fabrication method of the protective elements in the step (b), the heating layers 13 are formed on the second surface 32, but not limited thereto. In another embodiment, the heating layers are formed on the fourth surface 42. Each of the heating layers 13 corresponds to one of the first device areas 311 and one of the second device areas 411. In this embodiment, each of the heating layers 13 comprises a heating body 131, a first heating body electrode 132 and a second heating body electrode 133. The first heating body electrodes 132 respectively correspond to the first thermal electrodes 123 and the heat-conductive electrodes 114. The second heating body electrodes 133 respectively correspond to the second thermal electrodes 113. In one embodiment, the heating bodies 131 are made of resistive paste. The first and second heating body electrodes 132, 133 are made of metal materials, which are compatible with the LTCC process. The first and second heating body electrodes 132, 133 are printed on the heating layers 13.

With reference to FIG. 2A, a second embodiment of a fabrication method of the heating layers 13 in accordance with the fabrication method of the protective elements in the step (a), a third substrate 50 is provided. The third substrate 50 is made of LTCC. In this embodiment, the third substrate 50 has a fifth surface 51 and a plurality of third device areas 511 defined on the fifth surface 51, but not limited thereto. In one embodiment, the third substrate 50 has a sixth surface 52 and the third device areas 511 defined on the sixth surface 52. Each of the third device areas 511 corresponds to one of the first device areas 311 and one of the second device areas 411. Each of the third device areas 511 has a plurality of fourth holes 14c, 15c formed thereon, a fourth hole 17c and a fifth hole 16c formed thereon, a plurality of third sidewall recesses 191c, 192c formed thereon, and a third sidewall recess 193c formed thereon. The fourth holes 14c, 15c, 17c, the fifth holes 16c and the third sidewall recesses 191c, 192c, 193c are filled with conductive materials, which are compatible with the LTCC process.

In the step (b), the third substrate 50 is disposed between the first substrate 30 and the second substrate 40. The heating layers 13 are formed on the third device areas 511. The fabrication method of the heating layers 13 is similar to the first embodiment of the fabrication method of the heating layers 13, but the fourth holes 17c respectively correspond to the first heating body electrodes 132, the fifth holes 16c respectively correspond to the second heating body electrodes 133.

In the step (c), the third substrate 50 is stacked between the first substrate 30 and the second substrate 40. The fourth holes 14c, 15c, 17c respectively correspond to the first holes 14a, 15a, 17a and respectively correspond to the second holes 14b, 15b, 18b. The fifth holes 16c respectively correspond to the third holes 16. The third sidewall recesses 191c, 192c, 193c respectively correspond to the first sidewall recesses 191a, 192a, 193c and respectively correspond to the second sidewall recesses 191b, 192b, 193b.

In the step (d), the fourth holes 14c, the first holes 14a and the second holes 14b are respectively connected integrally to constitute the first conductive vias 14. The first conductive vias 14 are electrically connected to the first electrodes 121 and the third electrodes 111. The fourth holes 15c, the first holes 15a and the second holes 15b are respectively connected integrally to constitute the second conductive vias 15. The second vias 15 are electrically connected to the second electrodes 122 and the fourth electrode 112. The fourth holes 17c and the first holes 17a are respectively connected integrally to the second conductive holes 17. The second conductive holes 17 and the third conductive holes 18 are electrically connected to the first thermal electrodes 123, the heating layers 13 and the heat-conductive electrodes 114. The fifth holes 16c and the third holes 16b are respectively connected integrally to constitute the first conductive holes 16. The first conductive holes 16 are electrically connected to the second heating body electrodes 133 and the second thermal electrodes 113.

With the foregoing description, the inner connection layers 110, the outer connection layers 120 and the heating layers 13 are respectively formed on the first substrate 30, on the second substrate 40, and between the first substrate 30 and the second substrate 40 simultaneously. So the time of process is reduced and the concave portion of the prior art is withdraw to overcome the complicated method of the prior art.

In conclusion, the heating layer is mounted inside the body of the protective element, so the concave portion or the insulating member do not need to reduce the steps and the time. When the heating layer is heated, the heat may stores inside the body to fuse the low-melting-point alloy layer. Further, the outer connection layers are formed on the first substrate simultaneously, the inner connection layers are formed on the second substrate simultaneously, and the heating layers are formed between the first and second substrate simultaneously. Thus, the process time is effectively reduced.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A fabrication method of a protective element comprising steps of:
   (a) providing a first substrate, a second substrate, and an additional substrate, wherein
   the first substrate has a first surface and a plurality of first device areas defined on the first surface;
   the second substrate has a third surface and a plurality of second device areas defined on the third surface;
   the additional substrate has a primary surface, a secondary surface, a plurality of additional device areas defined on the primary surface or the secondary surface;
   the first device areas respectively correspond to the second device areas; and
   the additional device areas respectively correspond to the first and second device areas;
   (b) forming multiple outer connection layers respectively on each of the first device areas, forming multiple inner connection layers respectively on each of the second device areas, forming a plurality of heating layers between the first substrate and the second substrate, forming a plurality of heat-dissipation layers on the additional device areas of the additional substrate, wherein each of the outer connection layer is formed on one of the first device areas, each of the inner connection layers is formed on one of the second device areas, each of the heating layers corresponds to one of the first device areas and corresponds to one of the second device areas, and each of the heat-dissipation layers corresponds to one of the additional device areas;

(c) stacking the second substrate on the additional substrate with a fourth surface of the second substrate, and stacking the fourth substrate on a second surface of the first substrate;

(d) sintering the first substrate, the second substrate and the additional substrate to a body with a single insulation material, wherein the heating layers and the heat-dissipation layers are mounted inside the body and are encapsulated by the body;

(e) stacking a plurality of low-melting-point alloy layers on the inner connection layers, wherein each of the low-melting-point alloy layers is electrically connected to one of the heating layers, one of the outer connection layers and one of the heat-dissipation layers by the inner connection layer; and (f) cutting the body along adjacent edges of the second device areas to form a plurality of protective elements.

2. The fabrication method as claimed in claim 1, wherein the step (a) further comprises steps of forming a plurality of first holes on each of the first device areas, forming a plurality of second holes and a third hole on each of the second device areas, and filling the first holes, the second holes and the third holes with conductive materials;

the step (b) further comprises steps of forming a first electrode, a second electrode and a first thermal electrode on each of the first device areas to consist the corresponding outer connection layer, wherein the first electrode and the second electrode are respectively formed on two opposite long sides of each of the first device areas, the first thermal electrode is formed on one short side of each of the first device areas, the first holes respectively correspond to the first electrode, the second electrode and the first thermal electrode on each of the first device areas; and forming a third electrode, a fourth electrode and a second thermal electrode on each of the second device areas to consist the corresponding inner connection layer, wherein the third electrodes respectively correspond to the first electrodes, the fourth electrodes respectively correspond to the second electrodes, the second thermal electrode is extended between the third electrode and the fourth electrode on each of the second device areas, the second holes respectively correspond to the third electrodes, the fourth electrodes and the first thermal electrodes, the third holes respectively correspond to the second thermal electrodes; and forming a first heat-dissipation film, a second heat-dissipation film and a third heat-dissipation film to consist the corresponding heat-dissipation layer, wherein the first heat-dissipation films respectively correspond to the first electrodes, the second heat-dissipation films respectively correspond to the second electrodes and the third heat-dissipation films respectively correspond to the third electrodes;

in the step (c), the first holes respectively correspond to the second holes, the third holes respectively correspond to the heating layers;

in the step (d), the first holes and the second holes are respectively connected integrally to constitute a plurality of conductive vias, the conductive vias are formed through the body; and in the step (e), the low-melting-point alloy layers is electrically connected to the third electrode, the fourth electrode and the second thermal electrode on each of the second device areas, is electrically connected to the first electrode and the second electrode on each of the first device areas, and is electrically connected to each of the heating layer by the conductive material in the third hole.

3. The fabrication method as claimed in claim 1, wherein in the step (b), the heating layers are formed on the second surface or the fourth surface.

4. The fabrication method as claimed in claim 2, wherein the step (a) further comprises steps of providing a third substrate has a fifth surface and sixth surface, a plurality of third device areas defined on the fifth surface or the sixth surface, wherein each of the third device areas corresponds to one of the first device areas and the second device areas, each of the third device areas has a plurality of fourth holes and a fifth hole formed thereon, the fourth holes and the fifth holes are filled with conductive materials;

the step (b) further comprises steps of disposing the third substrate between the first substrate and the second substrate, and forming the heating layers respectively on each of the third device areas;

the step (c) further comprises a step of stacking the third substrate between the first substrate and the second substrate, wherein the fourth holes respectively correspond to the first holes and respectively correspond to the second holes, and the fifth holes respectively correspond to the third holes; and in the step (d), the fourth holes, the first holes and the second holes are respectively connected integrally to constitute the conductive vias, the conductive vias are formed through the body, the fifth holes and the third holes are respectively connected integrally to constitute the conductive holes.

5. The fabrication method as claimed in claim 2, wherein the step (b) further comprises a step of forming multiple heat-conduction electrodes respectively on the second device areas, wherein each heat-conduction electrode is formed on one of the second device areas and the heat-conduction electrodes respectively correspond to the first thermal electrodes.

6. The fabrication method as claimed in claim 1, wherein the step (c) further comprises a step of cutting the second device areas along with the edges thereof to a depth.

7. The fabrication method as claimed in claim 5, wherein in the step (b), the first electrode, the second electrode, the third electrode, the fourth electrode, the first thermal electrode, the second thermal electrode and the heat-conduction electrode are made by printing; and in the step (d), the first electrode, the second electrode, the third electrode, the fourth electrode, the first thermal electrode, the second thermal electrode and the heat-conduction electrode are further electroplated by electroplated materials.

8. The fabrication method as claimed in claim 1, wherein the step (f) further comprises a step of disposing a plurality of covers on the second device areas.

9. The fabrication method as claimed in claim 5, wherein the first electrode, the second electrode, the third electrode, the fourth electrode, the first thermal electrode, the second thermal electrode and the heat-conduction electrode are made of metal materials, which are compatible with a low temperature co-fired ceramic (LTCC) process.

10. The fabrication method as claimed in claim 1, wherein
the step (a) further comprises a step of forming a plurality of sixth holes on each of the additional device areas, and filling the sixth holes with conductive materials;
in the step (c), the sixth holes respectively correspond to the first holes and the second holes;
in the step (d), the sixth holes, the first holes and the second holes are respectively connected integrally to constitute a plurality of conductive vias, the conductive vias are formed through the body; and
in the step (e), the heat-dissipation layers are respectively electrically connected to the inner conduction layer, the outer conduction layer and the heating layer by the conductive vias.

* * * * *